United States Patent Office 3,591,586
Patented July 6, 1971

1

3,591,586
3-TERTIARY AMINO-4-TERTIARY
AMINOMETHYL-SYDNONES
Yoshio Imashiro, Osaka, and Katsutada Masuda, Hyogo, Japan, assignors to Takeda Chemical Industries, Ltd., Osaka, Japan
No Drawing. Filed Apr. 16, 1968, Ser. No. 721,627
Int. Cl. C07d 87/40
U.S. Cl. 260—246
30 Claims

ABSTRACT OF THE DISCLOSURE

Novel analgesic sydnone derivatives of the formula:

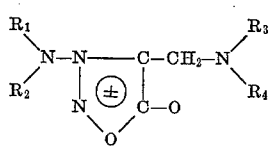

and pharmaceutically acceptable salts thereof wherein each of $R_1$ and $R_2$ is methyl or allyl or $R_1$ and $R_2$ taken together with the adjacent nitrogen atom are morpholino or piperidino and each of $R_3$ and $R_4$ is alkyl of one to five carbon atoms, allyl or benzyl or $R_3$ and $R_4$ taken together with the adjacent nitrogen atom are morpholino, piperidino, 4-benzylpiperazino, 4-p-chlorphenylphenylpiperazine, hexamethylenimino, 4-methylpiperazino, 4-formylpiperazino, pipecolino and pyrrolidino are provided. The novel compounds are produced by a novel process which comprises reacting a compound of the formula:

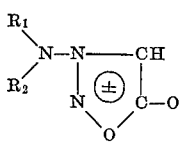

wherein $R_1$ and $R_2$ have the same meaning as defined above is reacted with formaldehyde and a secondary amine of the formula

wherein $R_3$ and $R_4$ have the same meaning as defined above.
Sydnone Derivatives of the formula

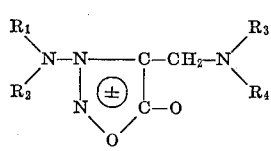

and pharmaceutically acceptable salts thereof, wherein each of $R_1$, $R_2$, $R_3$ and $R_4$ is $C_1$–$C_5$ alkyl, $C_2$–$C_5$ alkenyl or $C_7$–$C_9$ aralkyl, or where

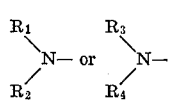

is a 5- to 7-membered heterocyclic ring, are analgesics of low toxicity in mammals. They are prepared by reacting the appropriate compound of the formula

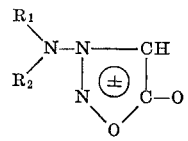

with formaldehyde and a secondary amine of the formula

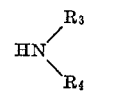

This invention relates to novel and useful sydnone derivatives, a method for producing them, and to pharmaceutical compositions containing them.

More particularly, the novel sydnone derivatives comprise compounds of Formula I and their pharmaceutically acceptable salts:

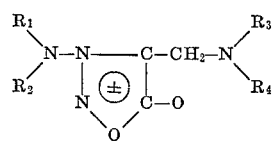

wherein each of $R_1$, $R_2$, $R_3$ and $R_4$ is alkyl of one to five carbon atoms; alkenyl of two to five carbon atoms; or aralkyl of seven to nine carbon atoms; or $R_1$ and $R_2$, or $R_3$ and $R_4$, together with the adjacent nitrogen atom, stand for a five- to seven-membered heteroyclic ring.

The principal object of the persent invention is to provide novel and useful sydnone derivatives of Formula I and pharmaceutically acceptable salts thereof.

Another object of this invention is to provide a new method for producing these new sydnone derivatives (I).

A further object is to provide pharmaceutical compositions comprising at least one of the sydnone derivatives (I).

These new compounds (I) are produced by reacting a compound of the formula:

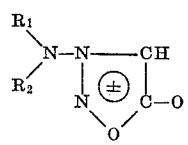

wherein $R_1$ and $R_2$ are the same as defined above with formaldehyde and a secondary amine of the formula

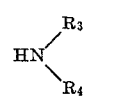

wherein $R_3$ and $R_4$ are the same as defined above.

The alkyl represented by each of $R_1$, $R_2$, $R_3$ and $R_4$ in the Formula I, II and III is exemplified by methyl, ethyl, propyl, isopropyl, butyl, isobutyl, pentyl, isopentyl, etc., the alkenyl is exemplified by allyl, butenyl, etc., and the aralkyl is exemplified by phenyl-lower alkyl, e.g. benzyl, phenethyl, phenylpropyl, etc.

When $R_1$ and $R_2$, or $R_3$ and $R_4$, taken together with the adjacent nitrogen atom, from a five- to seven-membered heterocyclic ring, the ring radical is, for example, morpholino, piperidino, piperazino, pyrrolidino, or hexamethyleneimino, and such radical can contain other substituents such as alkoxy of one to five carbon atoms, alkyl of one to three carbon atoms, phenyl, halophenyl (e.g. chlorophenyl or fluorophenyl), benzyl, formyl, phenethyl, etc., which take no part in the present reaction.

The starting Compound (II) is easily prepared, for example, by way of the following reaction sequence:

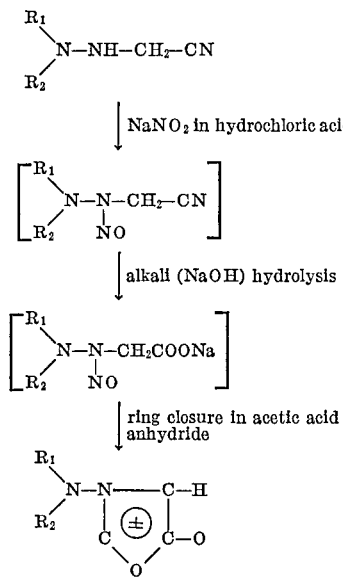

wherein $R_1$ and $R_2$ are the same as defined above.

In the method of the present invention, formaldehyde can be employed as an aqueous solution, but is more advantageously used in the form of paraformaldehyde.

The reaction is carried out under acidic conditions and a solvent such as water, an alcohol, an ether; an organic acid, etc., or a mixture thereof, is employed, so long as it does not disturb the reaction, but a weak organic acid such as acetic acid, is more desirably employed for the present reaction, by itself or in admixture with other solvents.

There is no need to acidify the reaction solution in case that the starting amine is added in the form of an acid addition salt thereof.

Other optional reaction conditions such as the reaction temperature and the reaction time vary with the sydnones and the secondary amines employed, but the reaction is usually carried out between about 0° C. and about 150° C. for from about 30 minutes to several hours. The formaldehyde and the secondary amine can be additionally supplied, if necessary.

The end product is usually obtained as free base and, if required, is converted into pharmaceutically acceptable salts thereof such as hydrochloride, picrate, nitrate, sulfate, phosphate, methiodide, etc. The sydnone derivatives of the present invention are low in toxicity to mammals and have a strong analgesic activity, as shown, for example, in the following tests.

Test 1.—Acute toxicity

A solution of test compound (3-dimethylamino-4-morpholinomethyl sydnone) in physiological saline was administered intraperitoneally in various dosages to groups of male mice, each group consisting of ten heads weighing about 18 grams each. After 24 hours' observation at 23° C., figures as shown in Table I were obtained by the Litchfield-Wilcoxon method.

TABLE I

| Dose, mg./kg. body weight | 1,100 | 1,200 | 1,320 | 1,450 | 1,600 | 1,730 |
|---|---|---|---|---|---|---|
| Number of mice killed tested | 0/10 | 3/10 | 9/10 | 8/10 | 8/10 | 10/10 |

Note.—Median Lethal Dose $(LD_{50})$=1,290 mg./kg; 95% confidential limits: 1,207.2 to 1,377.7 mg./kg.

Test 2.—Analgesic effect

The analgesic effect of the compounds was examined by the so-called writhing method.

A solution of test compound in physiological saline was administered orally in various dosages to groups of male mice, each group consisting of ten heads weighing about 18 grams each.

30 minutes after administration, 0.1 ml./10 g. of body weight of a 0.7% (by volume basis) acetic acid solution was administered intraperitoneally to each mouse, and its writhing was observed for 20 minutes after the administration of the acetic acid. The results are shown in Table II in comparison with the administration of a pure saline solution as a control. The percentages in the table are calculated on the basis of writhing frequency in the control.

TABLE II

| | Control | Test compound | | | | | |
|---|---|---|---|---|---|---|---|
| | | 3-dimethylamino-4-morpholino-methyl sydnone | | | | Acetyl salicylic acid | |
| Dose, mg./kg. body weight | | 400 | 200 | 100 | 50 | 25 | 400 | 20 |
| Percent | 100 | 6 | 1 | 34 | 16 | 41.5 | 25.6 | 38.9 |

The sydnone derivatives of the present invention are useful as analgesic agents and are generally administered orally in the form of capsule, syrup, oil, tablet, etc., or by way of injection or as an ointment for topical use.

Pharmaceutical composition containing one or more of the compounds of the present invention can be prepared according to any per se conventional method for the preparation of capsules, syrups, oils, injection, etc.

In the various aforementioned administration forms, the active ingredient can be present in a minor proportion relative to a major proportion of carrier, but the reverse relationship is also possible.

A typical effective daily dose of the sydnone derivatives of the present invention, when administered to the human adult, for example for the purpose of relieving headache pain, toothache pain or the like, is usually about 0.1 gram to 3.0 grams, desirably 0.15 gram to 0.30 gram, although an increased or reduced daily dose is also effective on the symptoms.

In order to further illustrate the present invention, the following examples are given.

In these examples, temperatures are all in degree(s) centigrade, and the abbreviations "g." and "ml." should be read as "gram(s)" and "milliliter(s)" respectively. Percentages are by weight.

EXAMPLE 1

5.2 g. of 3-dimethylaminosydnone, 1.5 g. of paraformaldehyde and 4.0 g. of morpholine are added for a mixture of 10 ml. of ethanol and 10 ml. of acetic acid, and heated at 100° C. for one hour. After cooling, the ethanol is distilled off under reduced pressure, and 30 ml. of water is added to the residue. The aqueous solution is neutralized with sodium hydrogen carbonate, and extracted with ethyl acetate. The extract is dehydrated, and concentrated to leave 8.4 g. of crude crystals, which are recrystallized from ligroin to give 7.1 g. (yield 77%) of 3-dimethylamino - 4 - morpholinomethylsydnone as colorless crystals melting at 101° to 102° C.

Analysis.—Calculated for $C_9H_{16}N_4O_3$ (percent): C, 47.36; H, 7.07; N, 24.55. Found (percent): C, 47.16; H, 6.96; N, 24.33.

EXAMPLE 2

10 g. of 3-morpholinosydnone, 3.5 g. of paraformaldehyde and 7 g. of morpholine are added to 60 ml. of acetic acid, and boiled for about two hours.

The acetic acid is removed under reduced pressure. The residue is dissolved in ethyl acetate and thereto is added a diluted hydrochloric acid solution to transfer the objective compounds to the aqueous phase.

The aqueous phase is neutralized by sodium hydrogen carbonate to precipitate oily substance, which is extracted with ethyl acetate. After drying, the solvent is removed to leave 9 g. of crude crystals, which are recrystallized from ethyl acetate to give 3-morpholino-4-morpholinomethylsydnone as colorless scales melting at 110° C.

This compound is converted into its hydrochloride melting at 206° C. (decomposition) by dissolving the former in a small amount of methanol, and adding thereto methanolic hydrochloric acid, and then ether under cooling.

*Analysis.*—Calculated for $C_{11}H_{18}N_4O_4$ (percent): C, 48.88; H, 6.71; N, 20.73. Found (percent): C, 48.88; H, 6.68; N, 20.69.

*Analysis.*—Calculated for $C_{11}H_{18}N_4O_4 \cdot HCl$ (percent): C, 43.06; H, 6.24; N, 18.26. Found (percent): C, 42.89; H, 6.21; N, 18.19.

EXAMPLE 3

2.6 g. of 3-dimethylaminosydnone, 1.0 g. of paraformaldehyde and 2.5 g. of 1-formylpiperazine are added to 10 ml. of acetic acid and heated at 100° C. for one hour.

Then the reaction mixture is neutralized with sodium hydrogen carbonate and extracted with ethyl acetate. The extract is subjected to drying and evaporation of the solvent to leave crude crystals, which are recrystallized from toluene to give 3.2 g. (yield 63%) of 3-dimethylamino-4-(4'-formylpiperazino)methylsydnone melting at 105° to 107° C.

*Analysis.*—Calculated for $C_{10}H_{17}N_5O_3$ (percent): C, 47.05; H, 6.71; N, 27.44. Found (percent): C, 46.82; H, 6.77; N, 27.60.

2.55 g. of 3-dimethyl-4-(4'-formalpiperazino)methylsydnone is mixed with a little excess of ethanolic hydrochloric acid and heated at 60° C. for an hour. The precipitated crystals are filtered and washed with ethanol to obtain 2.9 g. of 3-dimethylamino - 4 - piperazinomethylsydnone dihydrochloride as crude crystals, which are recrystallized from methanol to give crystals melting at 185° to 187° C. (decomposition).

In analogous manner, the following compounds are obtained:

3-dimethylamino-4-dimethylaminomethylsydnone (M.P. 33° C.);

3-dimethylamino-4-diethylaminomethyl sydnone (M.P. 20° C.);

3-dimethylamino-4-pyrrolidinomethylsydnone (picrate, M.P. 200° to 201° C.);

3-dimethylamino-4-(γ-pipecolinomethyl)sydnone (M.P. 76° C. to 77° C.);

3-dimethylamino-4-(β-pipecolinomethyl)sydnone (M.P. 66° to 67° C.);

3-dimethylamino-4-dibutylaminomethylsydnone (picrate, M.P. 95° to 96° C.);

3-dimethylamino-4-piperidinomethylsydnone (M.P. 64.5° to 65.5° C.);

3-dimethylamino-4-[(4'-benzyl piperazino)methyl]-sydnone (M.P. 110° to 111° C.);

3-dimethylamino-4-[4'-(p-chlorophenyl)piperazinomethyl]sydnone (M.P. 174° to 175.5° C.);

3-dimethylamino-4-morpholinomethylsydnone (methyliodide M.P. 156° to 158° C., decomposition);

3-dimethylamino-4-hexamethyleniminomethylsydnone (M.P. 71° to 72° C.);

3-dimethylamino-4-(4'-methylpiperazino)-methylsydnone (M.P.110° to 111° C.);

3-dimethylamino-4-dibenzylaminomethylsydnone (hydrochloride, M.P. 163° to 165° C., decomposition);

3-dimethylamino-4-diallylaminomethylsydnone (picrate, M.P. 128° to 130° C. (decomposition))

3-dimethylamino-4-α-pipecolinomethylsydnone (picrate, M.P. 181° to 182° C., decomposition);

3-diallylamino-4-morpholinomethylsydnone M.P. 78° to 80° C.);

3-morpholino-4-piperidinomethylsydnone (M.P. 92° to 94° C.);

3-morpholino-4-morpholinomethylsydnone (hydrochloride, M.P. 206° C., decomposition);

3-morpholino-4-diethylaminomethylsydnone (M.P. 53° C.);

3-morpholino-4-diethylaminomethylsydnone (hydrochloride, M.P. 167° C., decomposition);

3-piperidino-4-morpholinomethylsydnone (M.P. 77° to 78° C.);

3-piperidino-4-piperidinomethylsydnone (picrate, M.P. 193° to 193.5° C., decomposition);

3-morpholino-4-dimethylaminomethylsydnone (M.P. 86° to 87° C.)

Typical compositions comprising an active compound (I) according to the invention are:

Composition 1

| | Mg. per tablet |
|---|---|
| (1) 3-dimethylamino-4-morpholinomethylsydnone | 250 |
| (2) Microcrystalline cellulose | 142 |
| (3) Calcium salt of carboxymethylcellulose | 20 |
| (4) Lactose | 70 |
| (5) Talc | 15 |
| (6) Magnesium stearate | 3 |
| | 500 |

(1), one half quantity of (2), and (4) are kneaded with methanol solution of chloromethyl, and the mixture is dried under reduced pressure, then granulated. Remaining half of (2), (3), (5) and (6) are added to the granules and compressed into tablets. Thus-prepared tablets can further be coated with e.g. sugar.

Composition 2

| | Mg. per g. powder |
|---|---|
| (1) 3-dimethylamino - 4 - morpholinomethylsydnone | 200 |
| (2) Lactose | 600 |
| (3) Starch | 200 |
| | 1000 |

All ingredients are thoroughly mixed, the resultant admixture then serving as an oral powder.

Composition 3

| | Mg. per capsule |
|---|---|
| (1) 3-dimethylamino-4-morpholinomethylsydnone | 250 |
| (2) Gelatin capsule | 55 |
| | 305 |

Pulverized compound (1) is filled into the gelatin capsule.

In the above-mentioned illustrations, 3-dimethylamino-4-morpholinomethylsydnone can be replaced by any other compound I or salt thereof of the present invention on the molecular basis.

What is claimed is:

1. A sydnone derivative selected from the group consisting of compounds of the formula

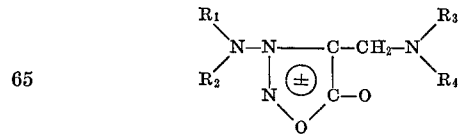

and pharmaceutically acceptable salts thereof, wherein each of $R_1$ and $R_2$ is methyl or allyl or $R_1$ and $R_2$ taken together with the adjacent nitrogen atom are morpholino or piperidino and each of $R_3$ and $R_4$ is alkyl of one to five carbon atoms, allyl or benzyl or $R_3$ and $R_4$ taken together with the adjacent nitrogen atom are morpholino, piperidino, 4-benzylpiperazino, 4-p - chlorophenylphenylpiperazino, hexamethylenimino, 4-methyl-piperazino, 4-formylpiperazino, pipecolino and pyrrolidino.

2. A compound according to claim 1, wherein the said salt is hydrochloride.

3. A compound according to claim 1, wherein the said salt is picrate.

4. A compound according to claim 1, wherein the said salt is methiodide.

5. A compound according to claim 1, namely 3-dimethylamino-4-morpholinomethylsydnone.

6. A compound according to claim 1, namely 3-dimethylamino-4-dimethylaminomethylsydnone.

7. A compound according to claim 1, namely 3-dimethylamino-4-diethylaminomethylsydnone.

8. A compound according to claim 1, namely 3-dimethylamino-4-pyrrolidinomethylsydnone.

9. A compound according to claim 1, namely 3-dimethylamino-4-γ-pipecolinomethylsydnone.

10. A compound according to claim 1, namely 3-dimethylamino-4-β-pipecolinomethylsydnone.

11. A compound according to claim 1, namely 3-dimethylamino-4-dibutylaminomethylsydnone.

12. A compound according to claim 1, namely 3-dimethylamino-4-piperidinomethylsydnone.

13. A compound according to claim 1, namely 3-dimethylamino-4[(4'-benzylpiperazino)methyl]sydnone.

14. A compound according to claim 1, namely 3-dimethylamino - 4 - [4'-(p-chlorophenyl)piperazinomethyl] sydnone.

15. A compound according to claim 1, namely 3-dimethylamino-4-hexamethylenimino-methylsydnone.

16. A compound according to claim 1, namely 3-dimethylamino-4-(4'-formylpiperazinomethyl)sydnone.

17. A compound according to claim 1, namely 3-dimethylamino-4-(4'-methylpiperazinomethyl)sydnone.

18. A compound according to claim 1, namely 3-dimethylamino-4-piperazinomethylsydnone.

19. A compound according to claim 1, namely 3-dimethylamino-4-dibenzylaminosydnone.

20. A compound according to claim 1, namely 3-dimethylamino-4-diallylaminomethylsydnone.

21. A compound according to claim 1, namely 3-dimethylamino-4-α-pipecolinomethylsydnone.

22. A compound according to claim 1, namely 3-diallylamino-4-morpholinomethylsydnone.

23. A compound according to claim 1, namely 3-morpholino-4-piperidinomethylsydnone.

24. A compound according to claim 1, namely 3-morpholino-4-morpholinomethylsydnone.

25. A compound according to claim 1, namely 3-morpholino-4-diethylaminomethylsydnone.

26. A compound according to claim 1, namely 3-piperidino-4-morpholinomethylsydnone.

27. A compound according to claim 1, namely 3-piperidino-4-piperidinomethylsydnone.

28. A compound according to claim 1, namely 3-morpholino-4-dimethylaminomethylsydnone.

29. A method for producing a sydnone derivative of the formula:

$$\begin{array}{c} R_1 \\ \phantom{xx}\diagdown \\ \phantom{xxxx}N-N-C-CH_2-N \\ R_2 \phantom{xxxx}|\phantom{xx}(\pm)\phantom{xx}| \\ \phantom{xxxxx}N\phantom{xx}C-O \\ \phantom{xxxxxxxx}\diagdown\diagup \\ \phantom{xxxxxxxxx}O \end{array} \begin{array}{c} R_3 \\ \diagup \\ \phantom{x} \\ \diagdown \\ R_4 \end{array}$$

wherein each of $R_1$ and $R_2$ is methyl or allyl or $R_1$ and $R_2$ taken together with the adjacent nitrogen atom are morpholino or piperidino and each of $R_3$ and $R_4$ is alkyl of one to five carbon atoms, allyl or benzoyl or $R_3$ and $R_4$ taken together with the adjacent nitrogen atom are morpholino, piperidino, 4-benzylpiperazino, 4-p-chlorophenylphenylpiperazino, hexamethylenimino, 4-methylpiperazino, 4-formylpiperazino, pipecolino and pyrrolidino, which comprises reacting a compound of the formula $$\begin{array}{c} R_1 \\ \diagdown \\ \phantom{xx}N-N-CH \\ R_2 \phantom{xx}|\phantom{xx}(\pm)\phantom{xx}| \\ \phantom{xxx}N\phantom{xx}C-O \\ \phantom{xxxxxx}\diagdown\diagup \\ \phantom{xxxxxxx}O \end{array}$$

wherein $R_1$ and $R_2$ have the same meaning as defined above, with formaldehyde and a secondary amine of the formula $$\begin{array}{c} R_3 \\ \diagup \\ HN \\ \diagdown \\ R_4 \end{array}$$

wherein $R_3$ and $R_4$ have the same meaning as defined above and recovering the resultant sydnone derivative.

30. The method according to claim 29 wherein the objective sydnone derivative is recovered in the form of its pharmaceutically acceptable salt.

No references cited.

ALEX MAZEL, Primary Examiner

J. TOVAR, Assistant Examiner

U.S. Cl. X.R.

260—247.2, 247.5, 268, 294.3, 294.7, 307; 424—248, 250, 267, 272